J. K. WHITE.
SEPARATOR.
APPLICATION FILED JULY 25, 1906.

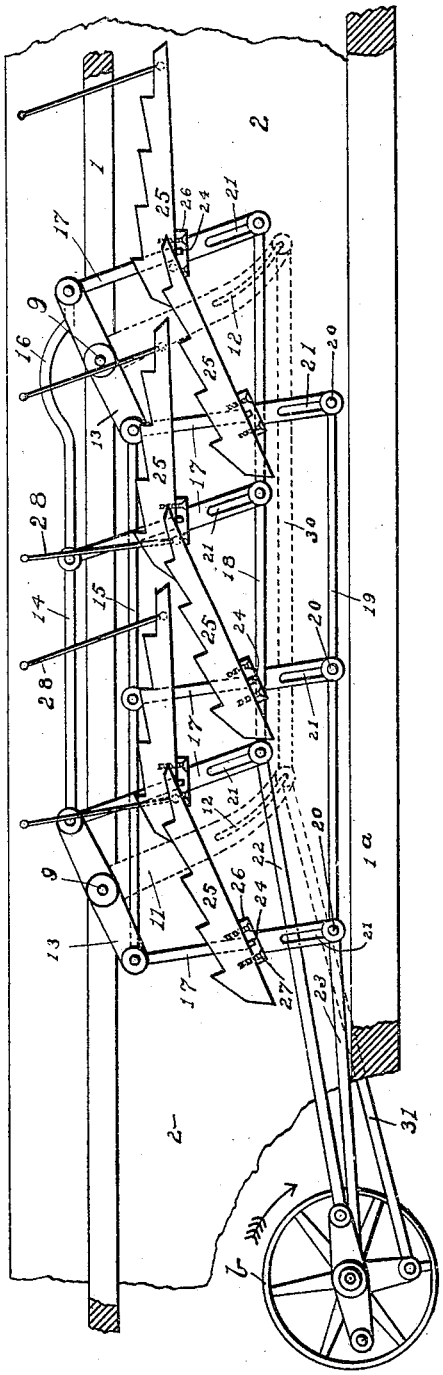

951,264.

Patented Mar. 8, 1910.

3 SHEETS—SHEET 2.

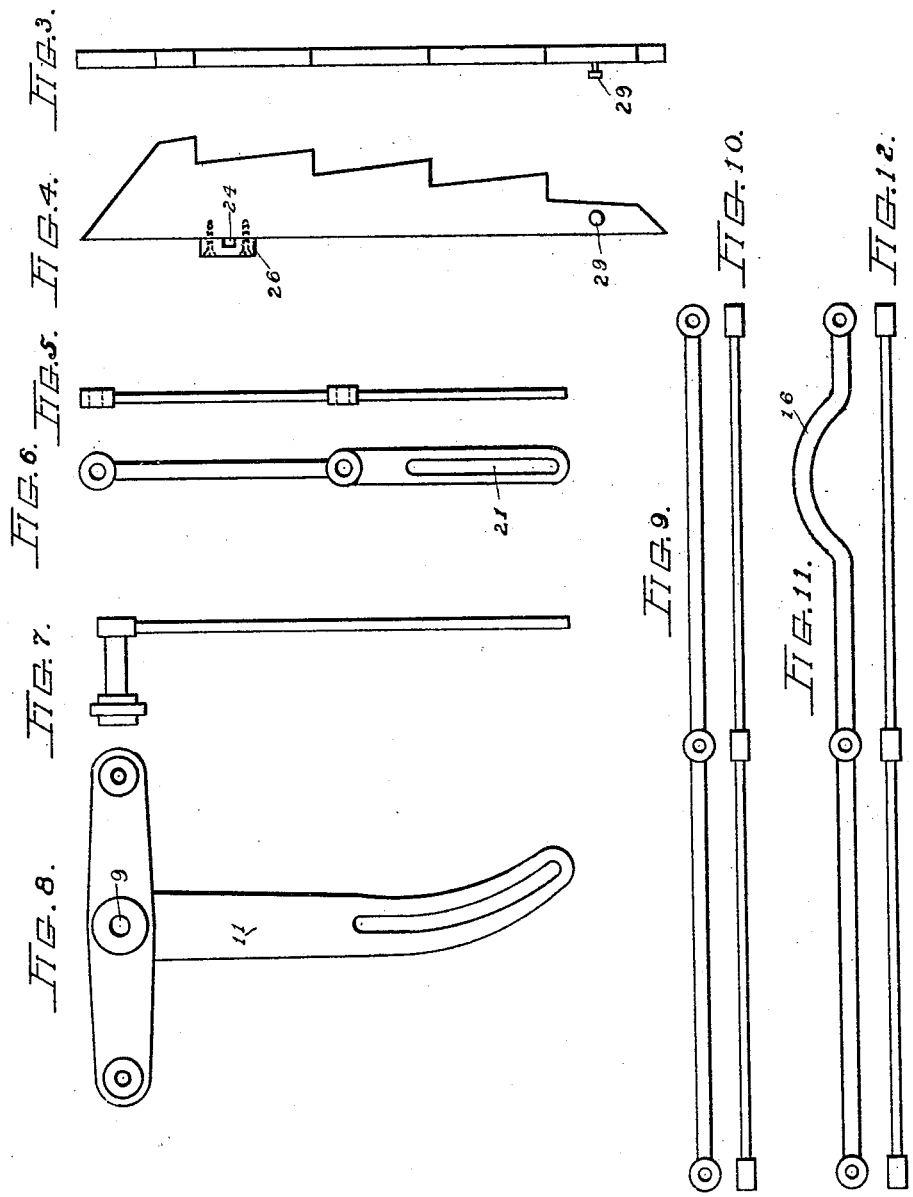

UNITED STATES PATENT OFFICE.

JAMES K. WHITE, OF SPRINGVILLE, TENNESSEE.

SEPARATOR.

951,264.  Specification of Letters Patent.  Patented Mar. 8, 1910.

Application filed July 25, 1906. Serial No. 327,700.

*To all whom it may concern:*

Be it known that I, JAMES K. WHITE, citizen of the United States, residing at Springville, in the county of Henry and State of Tennessee, have invented certain new and useful Improvements in Separators, of which the following is a specification.

My invention relates to separators and consists in suspending and arranging racks upon suitable bars in series in such a relative position as to permit the rear or free ends of the racks in each alternate series to extend beyond and pass between the front ends of the next succeeding series intermeshing with each other so that when one series completes their forward and upward movement and are returned, the alternate series are commencing their forward and upward movement conveying and agitating the straw continuously and simultaneously to effect thorough separation of the grain, seed, and chaff from the straw or grasses.

The object of my invention is to provide a means of imparting a variable movement to the racks so as to obtain the best results in the separation of different kinds of grain from the straw and seed from the grass.

A further object is to afford facilities for changing the position and travel of the racks and imparting circular, elliptical, oscillating or compound motion by adjustment of the parts.

An essential feature of my invention is in the application of the tee-rock shaft by means of which an upward and downward movement is imparted to the hangers carrying the racks by the rock-shaft in conjunction with usual oscillating motion communicated by the cranks.

It is well known that in order to obtain the best results in the separation of the grain and seed from the chaff and straw that the agitation of and movement of the straw must be regulated by the kind and condition of the grain, and the ability to change and vary the movement of the racks to conform to the required agitation is essential and of great advantage.

I attain these and other objects by the mechanism illustrated in the accompanying drawings in which—

Figure 1 is a side elevation of my device taken on the line X X of Fig. 2, showing the position of each alternate series of racks and the detail of the mechanism employed to operate them. Also broken sections of the frame and wall. Fig. 2, is a top plan view showing several series of racks arranged so as to form a surface for carrying the straw and grass leaving spaces between them to permit the grain and seed to drop into a suitable receptacle located in the bottom of the frame underneath the complete series of racks. Figs. 3 and 4 are side and top views respectively showing detail construction of one of the racks. Figs. 5 and 6 are top and side views of the pivotal hangers. Figs. 7 and 8 are side and top plan views of the rock-shaft and arms. Figs. 9 and 10 are side and top views of the lower connecting rods. Figs. 11 and 12 are side and top views of the upper connecting rods.

In the drawings 1 represents broken sections of the frame of the separator, and 2 represents a portion of the wall. A crank-shaft 3 is journaled in suitable bearings 4 which are mounted upon the lower and front portion 1 of the frame. The crank shaft is journaled transverse to the frame and is preferably constructed with a pair of twin-cranks 5 and 6 formed integral with or attached to the shaft just inside the frame. The cranks 5 and 6 are of equal throw and formed or placed on the shaft 3 diametrically opposed to and in alinement with each other. The ends of the crank-shaft project beyond the frame having cranks 7 and 8 formed integral therewith or attached at right angles, or one quarter in advance of the twin cranks.

Rock shafts 9 are journaled in suitable bearings 10 secured to the upper portion of the frame. Depending rocker arms 11 having the free ends curved forward with a slot 12 formed therein are secured to the end of the rock-shaft that extends outside of the frame of the separator. The opposite ends of the rock shafts project beyond the bearings into the frame of the separator to which cross arms 13 are secured extending parallel with and toward the front and rear ends of the frame from the center of the rock-shafts, which together with the depending arm 11 forms a "tee rocker arm" when mounted on or made integral with the rock-shaft. As shown in Fig. 2 of the drawing the cross arms operate within the frame and the depending arms operate outside the frame. An oscillating or swinging motion is imparted to them through the medium of the crank shaft which will be described hereinafter. The rock-shafts (or offset if made integral) are made of sufficient length to extend beyond the bearings into the frame carrying the cross-arms and the end outside the frame carrying the depending arm. Connecting rods 14 and 15 are pivotally secured to opposite ends and sides of the cross arms linking them together. The connecting rod 14 is provided with an offset 16 for the purpose of preventing it from interfering with the rock-shaft in its downward movement. Hangers 17 are pivotally secured to each end of the cross-arms of the rock-shaft and to the connecting rods 14 and 15 at any point between their ends.

The free ends of the hangers 17 are pivotally linked with the connecting rods 18 and 19 by the pivotal bolts 20. The bolts 20 pass through apertures in the connecting rods and the slots 21 cut in the free ends of the hangers. The bolts in the two foremost hangers project and are adapted to be inserted in apertures in one end of the pitman rods 22 and 23. The opposite ends of the pitman rods 22 and 23 are connected to the cranks 5 and 6 of the crank-shaft. When motion is imparted to the drive wheel $b$ an oscillating or swinging motion is communicated to the hangers 17 through the medium of the pitman rods which are pivotally secured to the cranks 5 and 6. The throws of both cranks are the same. The pitman rods are made of unequal length as the foremost hangers 17 to which they are connected are suspended from opposite ends of the cross-arms on the rock-shaft. The travel of the oscillating hangers is primarily regulated by the throw of the cranks but it can be varied making it more or less by raising or lowering the lower connecting rods 18 and 19 in the slots 21 thereby varying the distance between the pivotal connections of the hangers with the ends of the cross arms and lower connecting rods which regulate to an extent the oscillating movement of the hangers.

Bars 24 preferably square as shown in the drawing (see Fig. 1) are secured to the hangers at a predetermined point between the ends of the hangers. The bars 24 extend across or transverse to the frame of the separator between the hangers 17 (see Fig. 2) with the ends securely attached thereto. A series of, or two or more as desired tapered racks 25 having their upper edges serrated are mounted on the bars 24 with the ends directed rearward and intermeshing with each succeeding series of racks. The lengths of the racks are such that when one series of racks completes its travel and is making its return stroke, the next succeeding series are just commencing their forward travel. The ends of each series of racks intermesh with the series in front thereof.

The racks are attached to the bars by means of a cap 26 and the bolts 27 at such an inclination as will be found best adapted to the work. When a square bar is used it is not necessary to provide other means of retaining the rack in proper position. I prefer, however, to permit the square bar to pivot and retain the free ends of the rack in proper position by the pliable connections or straps 28 which afford facilities for changing the inclination of racks by varying the length of the straps. This is an advantage as it permits the rack to be held or retained at any desired inclination best suited to the kind and condition of the grain being separated.

One end of each strap is secured to the upper wall and the opposite end is secured to a pin 29 fastened to the side of the racks close to the end (see Fig. 3). The depending rocker-arms 11, which are secured to or made integral with the rock-shaft that projects outside the frame are connected by the link-bar 30. An auxiliary pitman rod 31 is pivotally secured to the foremost depending arm 11 and to the auxiliary crank 32 which is secured or made integral with the crank-shaft.

When movement is imparted to the crank-shaft and the depending arms of the rock-shafts through the medium of the auxiliary crank and connections, a swinging or oscillating motion is given to the depending arms 11 which in turn alternately impart an upward and downward movement to the cross-arm hangers and connections changing the relative position of the racks every revolution of the crank-shaft.

It will be noted that when the crank-shaft is revolved that one series of racks is moved forward and upward by the cranks 5 and 6 to the full extent of their travel, simultaneously therewith, the cross arms alternately raise and lower the hangers to which the racks are attached making it possible to generate and impart a circular oscillating, elliptical or compound motion and a rapid disappearing movement to the racks at the will of the operator. The extent of the oscillating motion of the cross-arms can be regulated by adjusting the auxiliary link-bars 30 in the slots 12.

It will be observed that while I have shown four tee rock-shafts and arms journaled on the frame the number can be increased if desired with additional series of racks. The number of racks mounted on the bars 24 can also be varied.

I have shown as a preferable method of construction twin-cranks as connections operating the racks on each side of the frame of the separator to more evenly balance the moving mechanism. It is obvious, however, that the objects can be accomplished by operating one pair of cranks from one side of the frame.

Various modifications or changes can be made in the construction of my device without departing from the principle involved herein.

What I claim and desire to secure by Letters Patent is—

1. A separator comprising levers, rods connecting the levers, hangers supported on the levers and rods, bars connected to the hangers, a longitudinal series of rows of racks a row of racks connected to each bar, connecting rods connected to the hangers and means connected to the connecting rods for transmitting motion to the racks.

2. A separator comprising a plurality of rows of inclined and horizontal racks, each row being in advance of the other, a bar connected to each row of racks, levers, hangers connected to the levers and bars, means connected to the levers for imparting motion to the racks, connecting rods connected to each longitudinally alternate hanger of the rows of racks, and means connected to the connecting rods for transmitting motion to the racks.

3. A separator comprising a longitudinal series of racks the ends of which are adapted to intermesh with each other, bars connected to the racks, levers, rods connecting the levers, hangers connected to the levers and bars, connecting rods connected to each longitudinally alternate hanger, a crank shaft and means connecting the levers and connecting rods to the crank shaft for imparting motion to the racks.

4. A separator comprising a longitudinal series of rows of racks, a bar connected to each row of racks, levers, hangers connected to the levers and bars, rods connected to each longitudinally alternate hanger of the rows of racks, and means connected to the rods for transmitting motion to the racks.

In testimony whereof I affix my signature in presence of two witnesses.

JAMES K. WHITE.

Witnesses:
GEO. W. PYLE,
PEARL ACKERMAN.